United States Patent [19]

Pronk et al.

[11] 3,920,538

[45] Nov. 18, 1975

[54] DEMETALLATION WITH NICKEL-VANADIUM ON SILICA IN A HYDROCARBON CONVERSION PROCESS

[75] Inventors: Karel M. A. Pronk; Swan T. Sie, both of Amsterdam, Netherlands

[73] Assignee: Shell Oil Company, Houston, Tex.

[22] Filed: Oct. 3, 1974

[21] Appl. No.: 511,867

[30] Foreign Application Priority Data
Nov. 30, 1973  Netherlands...................... 7316396

[52] U.S. Cl............................. 208/89; 208/251 H
[51] Int. Cl.²......................................... C10G 23/02
[58] Field of Search......................... 208/89, 251 H

[56] References Cited
UNITED STATES PATENTS

| | | |
|---|---|---|
| 3,362,901 | 1/1968 | Szepe et al............................ 208/89 |
| 3,365,389 | 1/1968 | Spars et al............................ 208/89 |
| 3,530,062 | 9/1970 | Gatsis................................... 208/89 |
| 3,583,902 | 6/1971 | Masologites et al............ 208/251 H |
| 3,617,502 | 11/1971 | Stolfa et al............................ 208/89 |
| 3,785,958 | 1/1974 | Gleim et al...................... 208/251 H |
| 3,788,973 | 1/1974 | Wolk et al....................... 208/251 H |
| 3,795,607 | 3/1974 | Adams et al.................... 208/251 H |
| 3,809,644 | 5/1974 | Johnson et al.................. 208/251 H |
| 3,870,623 | 3/1975 | Johnson et al.................. 208/251 H |

Primary Examiner—Delbert E. Gantz
Assistant Examiner—G. J. Crasanakis
Attorney, Agent, or Firm—Ronald R. Reper

[57] ABSTRACT

An improved demetallization process for residual hydrocarbons is disclosed employing as catalyst a combination of nickel and vanadium as metals or compounds on silica carrier of certain porosity and particle size relationship and having less than 0.5%w loss on ignition at 500°C.

10 Claims, No Drawings

DEMETALLATION WITH NICKEL-VANADIUM ON SILICA IN A HYDROCARBON CONVERSION PROCESS

BACKGROUND OF THE INVENTION

Netherlands Patent application No. 7309387 relates to a process for the catalytic conversion of a residual hydrocarbon oil, in which process the oil is first demetallized and subsequently catalytically converted. According to said Netherlands patent application, the demetallization is carried out by contacting the oil at elevated temperature and pressure and in the presence of hydrogen with a catalyst comprising one or more metals having hydrogenation activity on a carrier, which catalyst satisfies a number of requirements regarding particle size and porosity.

A continued investigation into the demetallization of residual hydrocarbon oils with the aid of catalysts meeting the requirements set out in the above Netherlands patent application with regard to particle size and porosity has revealed that the activity of certain catalysts, which comprise 0.1–15 parts by weight of the metal combination nickel-vanadium per 100 parts by weight of silica carrier, is highly dependent on their loss on ignition determined under standard conditions.

It has been found that these catalysts possess optimum activity if said loss on ignition amounts to less than 0.5 percent by weight.

SUMMARY OF THE INVENTION

The present patent application therefore relates to an improved process for the catalytic conversion of a residual hydrocarbon oil according to the Netherlands Patent application No. 7309387, in which process the oil is first demetallized and subsequently catalytically converted and in which the demetallization is carried out by contacting the oil at elevated temperature and pressure and in the presence of hydrogen with a catalyst comprising one or more metals having hydrogenation activity on a carrier, which catalyst meets the following requirements:

1. $p/d > 3.5 - 0.02\, v$, in which $p$ is the specific average pore diameter in nm, $d$ is the specific average particle diameter in mm and $v$ is the percentage of the total pore volume that consists of pores with a diameter larger than 100 nm
2. the total pore volume is larger than 0.40 ml/g
3. $v$ is smaller than 50, and
4. the surface area is larger than 100 m²/g, with the proviso that if the catalyst has such a p and d that the quotient p/d is larger than 3.5–0.02 v but at most 10–0.15 v, the catalyst should meet the following additional requirements:
    a. the nitrogen pore volume is larger than 0.60 ml/g,
    b. the surface area is larger than 150 m²/g and
    c. p is larger than 5 nm the improvement consists in that the demetallization is carried out in the presence of a catalyst which comprises 0.1–15 parts by weight of the metal combination nickel-vanadium per 100 parts by weight of silica carrier and which shows a loss on ignition, determined under standard conditions, of less than 0.5 percent by weight.

In the process according to the invention use is preferably made of a catalyst which shows a loss on ignition, determined under standard conditions, of less than 0.2 percent by weight.

DESCRIPTION OF PREFERRED EMBODIMENTS

In the process according to the invention it is important that at the moment that the catalyst is introduced into the demetallization reactor, it has a loss on ignition, determined under standard conditions, of less than 0.5 percent by weight and preferably of less than 0.2 percent by weight. In this application, loss on ignition of a catalyst determined under standard conditions is understood to be the weight loss expressed as a percentage which occurs if a sample 5–10 g of the catalyst, spread in a layer thickness of less than 1 cm in a well-ventilated drying oven, is heated in 1 hour from room temperature to 500°C. and subsequently maintained at 500°C for 2 hours. This loss on ignition may be achieved by both carefully calcining and carefully handling the catalyst. In this connection by "carefully calcining the catalyst" is understood that the calcination is carried out in such a way that a catalyst is obtained having a loss on ignition, determined under standard conditions, of less than 0.5 percent by weight, and preferably less than 0.2 percent by weight. Careful calcination can be effected by applying the calcination to a catalyst which is spread in a relatively thin layer and by providing, during calcination, proper ventilation of the space in which the calcination is carried out. The above expression "careful handling of the catalyst" means that after careful calcination of the catalyst it is ensured that, inter alia during storage and transport of the carefully calcined catalyst as well as during filling of the demetallization reactor with this catalyst, the loss on ignition of the catalyst, determined under standard conditions, increases as little as possible and remains at any rate below 0.5 percent by weight. Careful handling of the catalyst means, inter alia, that it is ensured that the catalyst is prevented as far as possible from absorbing moisture, for example, as the result of contact with moist air. If the catalyst is not sufficiently carefully calcined or if the catalyst is adequately carefully calcined but handled with insufficient care, it is nevertheless possible to prepare a catalyst suitable for the process according to the present invention by sufficiently reducing the moisture content of the catalyst, for example by drying the catalyst in a dry gas at elevated temperature or by subjecting the catalyst to a careful recalcination before contacting it with the feed to be demetallized. This reduction in the moisture content of the catalyst may, for example, be effected while the catalyst is already present in the demetallization reactor.

The discovery that the activity of demetallization catalysts according to the Netherlands Patent application No. 7309387 which comprise 0.1–15 parts by weight of the metal combination nickel-vanadium per 100 parts by weight of silica carrier is highly dependent on their loss on ignition, determined under standard conditions, and that these catalysts have an optimum activity if said loss on ignition is less than 0.5 percent by weight and preferably less than 0.2 percent by weight is very surprising if it is considered that the activity of closely related catalysts which, however, comprise alumina as carrier instead of silica, is independent of said loss on ignition.

The atomic ratio between the metals nickel and vanadium in the present catalysts is preferably between 0.05 and 3.0. The amount of nickel and vanadium present in the catalysts is preferably 0.5–10 parts by weight and particularly 2.0–7.5 parts by weight per 100 parts by weight of silica carrier. An especially preferred demetallization catalyst according to the invention is a catalyst which comprises about 0.5 part by weight of nickel and about 2.0 parts by weight of vanadium per 100 parts by weight of silica carrier. The metals may be present on the carrier in the metallic form or in the form of their oxides or sulfides. Preference is given to catalysts in which the metals are present on the carrier in the form of their sulfides. Sulfidation of the present catalysts may be carried out by any of the techniques for the sulfidation of catalysts known in the art. In addition to the metals nickel and vandium, the catalysts may comprises promoters such as phosphorus, boron or halogen.

The preparation of the catalysts used in the demetallization may be carried out by depositing nickel and vanadium on a silica carrier having such a porosity that after deposition of the nickel and vanadium thereon, a catalyst is obtained which meets the requirements of the invention, either as such or after the specific average catalyst particle diameter has been adapted. As has been explained in the Netherlands Patent application No. 7309387, incorporated herein by reference, the porosity of a carrier is mainly determined by the manner in which the carrier is prepared.

The catalysts may be prepared by any of the techniques for the preparation of supported catalysts known in the art. It is not necessary for nickel and vanadium to be deposited on a finished silica carrier; they may also be incorporated into the silica carrier material during the preparation thereof, for example, prior to shaping.

Silica carriers are usually prepared by precipitating a silica hydrogel, followed by shaping and calcining. Usually, before being shaped, the silica hydrogel is allowed to age. Very active demetallization catalysts according to the invention can be prepared by incorporating nickel and vanadium into the silica hydrogel before the latter is shaped. The incorportion of nickel and vanadium into the silica hydrogel is preferably carried out after the latter has been aged. A very active demetallization catalyst according to the invention may, for example, be prepared by incorporating into a silica hydrogel a nickel and a vanadium compound in an amount corresponding to about 0.5 parts by weight of nickel and about 2.0 parts by weight of vanadium per 100 parts by weight of final carrier, after the said hydrogen has been precipitated and aged but before it is shaped and calcined.

Another attractive way of preparing demetallization catalysts according to the invention is by at least one, i.e., single or multi-step co-impregnation of a carrier with an aqueous solution comprising a nickel compound and a vanadium compound, followed by drying and calcining. Examples of suitable water-soluble compounds of nickel and vanadium which may be applied in the preparation of the present catalysts are nickel nitrate, chloride, carbonate, formate and acetate, vanadyl oxalate, sulfate and acetyl acetonate and ammonium vanadate.

Very suitable carriers for the present catalysts are silica particles prepared by spray-drying of a silica gel followed by shaping of the spray-dried microparticles into larger particles, for example by extrusion, and spherical silica particles obtained by the known oil drop method.

Shaping of the present catalysts and catalyst carriers can very suitably be effected by extrustion or tabletting. Another most attractive shaping technique is granulation. According to this technique small particles of the catalyst or carrier material are intimately mixed with a liquid in such a proportion that agglomeration of the small particles to larger particles (granules) occurs.

For the catalytic hydrodemetallization of residual hydrocarbon oils according to the invention, use is generally made of catalyst particles having a d of 0.45–5.0 mm. Catalyst particles having a $d$ of 0.5–4.0 mm and particularly of 0.6–3.0 mm are preferred for this purpose.

The catalyst particles preferably have a total pore volume of at least 0.50 ml/g, while the surface area is preferably larger than 150 m$^2$/g.

As described in Netherlands Patent application No. 7309387 suitable reaction conditions for demetallization include a temperature in the range from about 350° to about 450°C, a total pressure of 75–250 bar, a space velocity of 0.1–25 pbv of fresh feed per pbv of catalyst per hour and in the presence of hydrogen at a hydrogen/feed ratio of 100–2,000 Nl H$_2$/kg feed.

The invention will now be further elucidated with the aid of the following example which refers to the demetallization step of the process.

EXAMPLE

A residual hydrocarbon oil having a total vanadium and nickel content of 62 ppmw, a C$_5$-asphaltene content of 6.4 percent by weight and a sulfur content of 3.9 percent by weight, which oil was obtained as a residue in the atmospheric distillation of a Middle East crude oil, was subjected to catalytic hydrogenative demetallization at various space velocities and using 6 different catalysts. To this end the oil was passed together with hydrogen downwardly through a cylindrical, vertically arranged fixed catalyst bed at a temperature of 420°C, a total pressure of 150 bar and a gas velocity (measured at the reactor outlet) of 250 Nl of hydrogen per kg of fresh feed. The catalysts were used in the form of their sufides.

The preparation of the six catalysts used in the demetallization tests is described below. The results of the demetallization tests as well as the space velocities used and the catalyst properties are summarized in the Table.

CATALYST PREPARATION

Catalysts A and B

These catalysts, which comprises 0.5 part by weight of nickel and 2.0 parts by weight of vanadium per 100 parts by weight of silica carrier, were prepared by impregnation of a silica carrier with an aqueous solution containing vanadyl oxalate and nickel nitrate. After drying of the impregnated material at 120°C it was calcined in a 6 cm-thick layer in a non-ventilated muffle-furnace for 1 hour at 500°C. The calcined material was divided into two portions. One portion was carefully recalcined in a layer thickness of less than 1 cm in a well-ventilated muffle-furnace for 1 hour at 500°C and introduced as catalyst A into the demetallization reactor with the exclusion of moisture. The other portion was introduced into the demetallization reactor as catalyst B.

Catalysts C and D

These catalysts, which comprises 0.5 part by weight of nickel and 2.0 parts by weight of vanadium per 100 parts by weight of silica carrier, were prepared, like the catalysts A and B, by impregnation of a silica carrier with an aqueous solution comprising vanadyl oxalate and nickel nitrate. After drying of the impregnated material at 120°C, it was carefully calcined in a layer thickness of less than 1 cm in a well-ventilated muffle-furnace for 1 hour at 600°C. The calcined material was divided into two portions. One portion was introduced as catalyst C into the demetallization reactor with the exclusion of moisture. The other portion was kept in contact with moist air for one week and subsequently introduced into the demetallization reactor as catalyst D.

Catalysts E and F

These catalysts, which comprises 0.5 part by weight of nickel and 2.0 parts by weight of vanadium per 100 parts by weight of alumina carrier, were prepared by impregnation of an alumina carrier with an aqueous solution comprising vanadyl oxalate and nickel nitrate. After drying of the impregnated material at 120°C, it was carefully calcined in a layer thickness of less than 1 cm in a well-ventilated muffle-furnace for 1 hour at 500°C. The calcined material was divided into two portions. One portion was introduced as catalyst E, into the demetallization reactor with the exclusion of moisture. The other portion was kept in contact with moist air for two months and subsequently introduced into the demetallization reactor as catalyst F.

further requirements according to the said Netherlands patent application in respect of $v$ (<50%), total pore volume (>0.40 ml/g) and surface area (>100 m$^2$/g).

Of the experiments mentioned in the Table only the experiments 1 and 3 (in which Ni/V/SiO$_2$ catalysts were used having the required metal load and a loss on ignition determined under standard conditions of less than 0.5% by wt.) are demetallization experiments in accordance with the present invention.

The experiments 2, 4, 5 and 6 mentioned in the Table are outside the scope of the present invention and have been included for comparison. In the experiments 2 and 4 catalysts were used having a loss on ignition determined under standard conditions of more than 0.5% by weight. In the experiments 5 and 6 catalysts were used containing alumina as carrier.

The effect of the moisture content of the catalysts on their demetallization activity can be clearly seen by comparing the results of the experiments 1 and 3 with those of the experiments 2 and 4. It is found that the catalysts A and C according to the present invention (having a loss on ignition determined under standard conditions of less than 0.5 percent by weight) which were used in the experiments 1 and 3 show approximately the same percentage of V + Ni removal after processing 5 tons of feed per kg of catalyst as the catalysts B and D outside the scope of the present invention

TABLE

| Experiment No. | 1 | 2 | 3 | 4 | 5 | 6 |
|---|---|---|---|---|---|---|
| Catalyst No. | A | B | C | D | E | F |
| Space velocity, $l.l^{-1}h^{-1}$ | 6.1 | 3.3 | 5.0 | 4.1 | 4.6 | 4.6 |
| Surface area, m$^2$/g | 193 | 193 | 252 | 252 | 225 | 225 |
| Total pore volume, ml/g | 0.79 | 0.79 | 0.80 | 0.80 | 0.57 | 0.57 |
| Nitrogen pore volume, ml/g | 0.78 | 0.78 | 0.76 | 0.76 | 0.56 | 0.56 |
| $v$, % | 6 | 6 | 7 | 7 | <0.5 | <0.5 |
| $d$, mm | 2.4 | 2.4 | 2.2 | 2.2 | 0.7 | 0.7 |
| $p$, nm | 10.1 | 10.1 | 11.0 | 11.0 | 10.2 | 10.2 |
| Loss on ignition determined under standard conditions, % by wt. | 0.0 | 0.9 | 0.0 | 1.5 | 0.0 | 5.9 |
| V + Ni removal (percentage by wt. given under I) after processing of a certain number of tons/kg of catalyst (number of tons stated under II) | | | | | | |
| I | 47 | 46 | 48 | 47 | 50 | 50.5 |
| II | 5 | 5 | 5 | 5 | 5 | 5 |
| I | 48 | 48 | 49 | 48 | | |
| II | 2 | 2 | 2 | 2 | | |

Accordingly to the Netherlands Patent application No. 7309387 a catalyst should, under the conditions used in these demetallization tests, meet the criterion that the catalyst should still be capable of removing more than 40 percent by weight of the total amount of vanadium and nickel present in the oil after 5 tons of the oil have been processed over the catalyst at a space velocity of at least 2.9 $l.l^{-1}.h^{-1}$.

All the experiments mentioned in the Table (in which the catalysts met the above-mentioned requirement in respect of the percentage by weight of Ni + V removal) are demetallization tests within the scope of the Netherlands Patent application No. 7309387.

In the experiments 1–4, in which catalysts were used with 10.0–0.15 $v \geq p/d > 3.5$–0.02 $v$, these catalysts also met the additional requirements according to the said Netherlands patent application in respect of $v$ (<50%), $p$ (> 5 nm), nitrogen pore volume (>0.60 ml/g) and surface area (>150 m$^2$/g).

In the experiments 5 and 6, in which catalysts were used with $p/d$ > 10.0–015 $v$, these catalysts also met the (with a loss on ignition determined under standard conditions of more than 0.5 percent by weight) which were used in the experiments 2 and 4. However, the great difference resides in the space velocity used in the experiments, which velocity was considerably higher when using the two catalysts according to the present invention than when using the two other catalysts.

Comparison of the results of the experiments 5 and 6 reveals that the demetallization activity of a nickel-vanadium catalyst based on alumina is insensitive to the moisture content of the catalysts. Although the loss of ignition, determined under standard conditions, of the catalyst E used in experiment 5 was 0.0 percent by weight and that of catalyst F used in experiment 6 was 5.9 percent by weight, practically the same demetallization activity was observed in both experiments, which were carried out at the same space velocity.

What is claimed is:

1. In a process for the catalytic conversion of a residual hydrocarbon oil, in which process the oil is first demetallized and subsequently catalytically converted and in which the demetallization is carried out by contacting said oil at a temperature of 350°–450°C, a total pressure of 75–250 bar, a space velocity of 0.1–25 pbv of fresh feed per pbv of catalyst per hour with hydrogen at a hydrogen/feed ratio of 100–2000 Nl $H_2$/kg feed and with a catalyst comprising 0.1–15 parts by weight of nickel and vanadium metals the oxides or sulfides thereof per 100 parts by weight of silica carrier, said catalyst meeting the following requirements:

the quotient *p/d* is greater than 3.5–0.02$v$, in which p is the specific average pore diameter in nm, *d* is the specific average particle diameter, said particle diameter being between 0.4 to 5.0 mm, and v is the percentage of the total pore volume that consists of pores with a diameter larger than 100 nm; and a. when the quotient *p/d* is greater than 10.0–0.15$v$, the total pore volume is larger than 0.40 ml/g, v is smaller than 50, the surface area is larger than 100 $m^2$/g and p is larger than 5 nm; and b. when the quotient *p/d* is at most 10–0.15$v$, the nitrogen pore volume is larger than 0.60 ml/g, the surface area is larger than 150 $m^2$/g, and p is larger than 5 nm, the improvement comprising said demetallization step being carried out with said catalyst which shows a loss on ignition, at 500°C for two hours, of less than 0.5% by weight.

2. A process as in claim 1, wherein said demetallization step is carried out with said catalyst which shows a loss on ignition, determined under said conditions, of less than 0.2% by weight.

3. A process as in claim 1, wherein said demetallization step is carried out with said catalyst comprising 0.5–10 parts by weight of nickel and vanadium per 100 parts by weight of silica carrier.

4. A process as in claim 1, wherein said demetallization step is carried out in the presence of a catalyst in which the atomic ratio of nickel to vanadium is between 0.05 and 3.0.

5. A process as in claim 1, wherein said demetallization step is carried out with said catalyst which comprises about 0.5 part by weight of nickel and 2.0 parts by weight of vanadium per 100 parts by weight of silica carrier.

6. A process as in claim 1, wherein said demetallization step is carried out with said catalyst which comprises the metals nickel and vanadium in the form of their sulfides.

7. A process as in claim 1, wherein said catalyst having been prepared by incorporating nickel and vanadium into a silica hydrogel and shaping the hydrogel containing said nickel and said vanadium.

8. A process as in claim 1, wherein said catalyst having been prepared by at least one step of co-impregnating silica carrier with an aqueous solution comprising a nickel and a vanadium compound, followed by drying said impregnated silica carrier and calcining said dried, impregnated silica carrier.

9. A process as in claim 8, wherein said catalyst includes silica carrier selected from the group consisting of (a) particles prepared by spray-drying of silica gel microparticles followed by shaping of the spray-dried microparticles into larger particles and (b) spherical silica particles obtained by the oil drop method.

10. A process as in claim 1, wherein said demetallization step is carried out with said catalyst having a specific average particle diameter of 0.5–4.0 mm.

* * * * *